United States Patent [19]

Nosler

[11] 4,248,532
[45] Feb. 3, 1981

[54] ELECTRO-OPTICAL DISTANCE-MEASURING SYSTEM

[76] Inventor: John C. Nosler, 2587 Floral Hill Dr., Eugene, Oreg. 97403

[21] Appl. No.: 973,227

[22] Filed: Dec. 26, 1978

[51] Int. Cl.³ .......................... G01C 3/00; G01C 5/00; G01C 11/26; A47J 7/08
[52] U.S. Cl. ........................................ 356/1; 356/141; 356/384
[58] Field of Search ........................ 356/1, 4, 141, 373, 356/375, 376, 381, 384, 385; 250/560, 561

[56] References Cited
U.S. PATENT DOCUMENTS

| | | | |
|---|---|---|---|
| 3,198,952 | 8/1965 | Benham et al. | 356/1 |
| 3,894,802 | 7/1975 | Higgins | 356/376 |
| 3,914,011 | 10/1975 | Mallinson et al. | 350/50 |
| 4,040,738 | 8/1977 | Wagner | 356/1 |

Primary Examiner—Stephen C. Buczinski
Attorney, Agent, or Firm—Kolisch, Hartwell & Dickinson

[57] ABSTRACT

Electro-optical apparatus for locating the surface of an object. A laser projects a beam along one axis. Light from the beam which is reflected by an impinged object is viewed along another axis, and is transmitted to a linear (straight-line) photodetector array. The array is specially oriented angularly relative to the viewing axis and to the laser beam axis, whereby, within the selected dynamic range of the apparatus, reflected light transmitted to the array is, under all circumstances, in sharp focus along the plane of the array.

4 Claims, 1 Drawing Figure

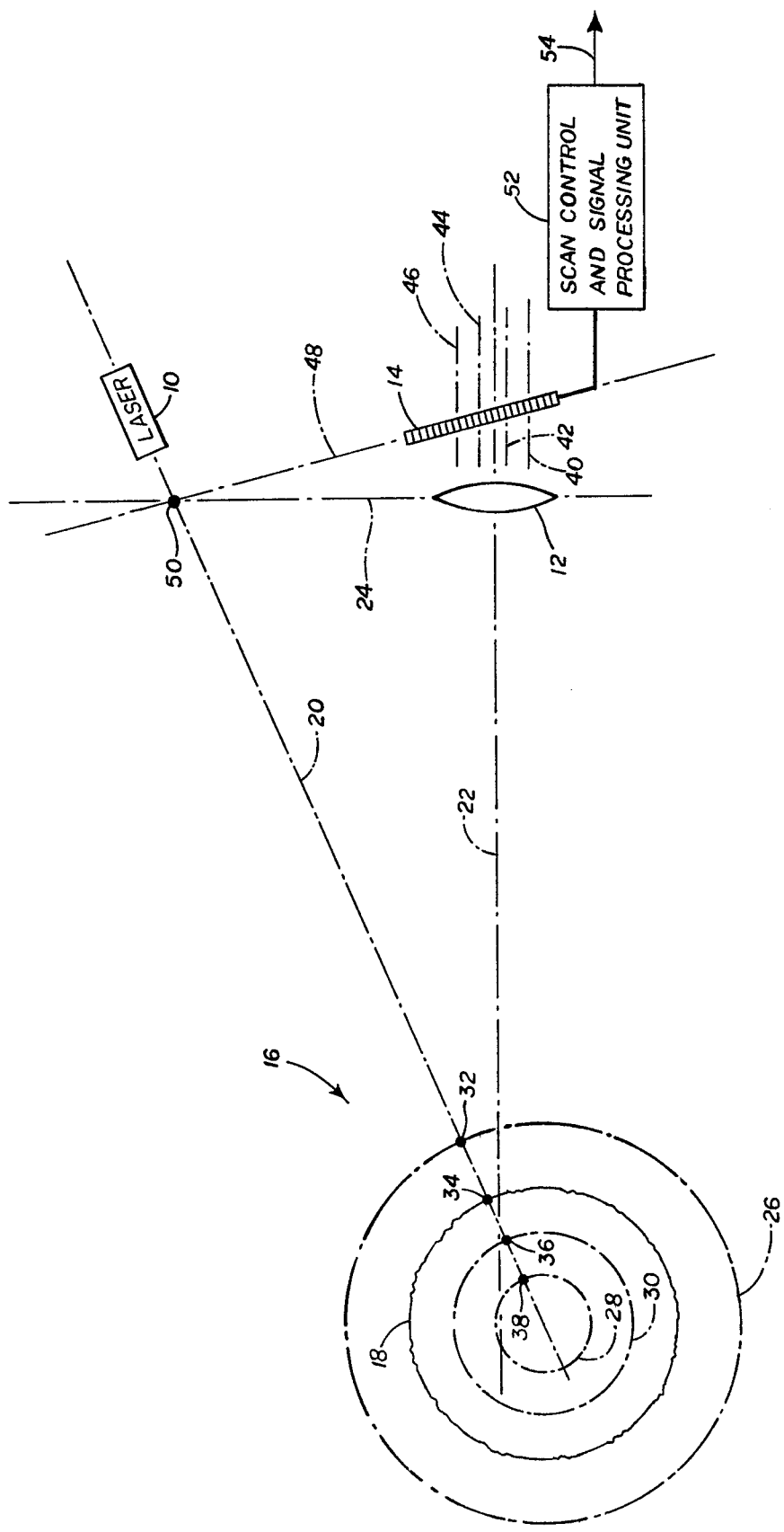

ELECTRO-OPTICAL DISTANCE-MEASURING SYSTEM

BACKGROUND AND SUMMARY OF THE INVENTION

This invention pertains to electro-optical distance-measuring apparatus, and more particularly, to a unique positional and attitudinal arrangement of components in such apparatus which promotes a high degree of accurate performance over a relatively wide dynamic range of distances.

There are many instances, such as for example in a plywood mill, where it is desired to make an accurate measurement of the distance between a known location and a particular object, so as to locate the object (or more particularly, the object's near surface) as precisely as possible in space. A preferred embodiment of the present invention is described herein in conjunction with a block centering operation, wherein it is important to be able to position a log in a closely controlled position relative to a veneer peeler blade.

According to this preferred embodiment a small-diameter laser beam is projected along one axis toward what might be thought of as a viewing zone, in which logs are expected to appear prior to a block centering operation. "Looking", so-to-speak, along another and intersecting axis is an optically sensitive viewer which looks for light from this beam which is reflected from a log's surface.

It is known, and expected, that logs appearing within this zone will have different diameters. For example, it might be typical to expect logs having diameters in the range of about 8-inches to about 48-inches. Obviously, the distance-measuring system of the invention must be capable of monitoring logs within such diameter range. As will be more fully explained below, the angle between the beam-projection axis and the viewing axis is selected both to accommodate the "dynamic range" of expected log-diameter differences, and to maximize the resolution accuracy of viewed reflected light, so that such accuracy does not vary, in any appreciable sense, over the entire selected dynamic range.

Employed in the "viewing" portion of the apparatus are a lens and a linear (straight-line) photodetector array. When the laser beam strikes the surface of a log, the lens focuses onto the array an image of the reflected light. The position of such image, along the length of the array, is directly interpretable to indicate the distance to the impinged log surface. Throughout the dynamic range of the apparatus, and as logs of different diameters are observed, imaged reflected light will strike the photodetector array at different specific points along its length.

A unique and important feature of the present invention is the discovery that the angular positioning of the photodetector array is critical to assuring that, throughout the dynamic range which is contemplated, a reflected image on the array will always be in sharp focus thereon. In other words, with proper attention to such angular positioning, the focus of the image is independent of log-surface distance. If attention is not paid to this important angular positioning of the array, the focus of a reflected image thereon will change throughout the dynamic range, and will thus cause significant resolution accuracy differences.

These and various other objects and advantages which are attained by the invention will become more fully apparent as the description which now follows is read in conjunction with the accompanying drawing.

DESCRIPTION OF THE DRAWING

The single drawing FIGURE illustrates, in schematic form, a preferred embodiment of the distance-measuring apparatus of the invention. The drawing is not prepared to scale.

DETAILED DESCRIPTION OF THE INVENTION

Turning now to the drawing, what is shown herein is a side schematic view illustrating the components of the distance-measuring apparatus contemplated herein, and of the special positional and attitudinal arrangement of such components. The parts are not drawn to scale. Included within the apparatus are a laser 10, also referred to as a beam-projecting means, a lens 12, also referred to as a gathering means, and a linear photodetector array 14, which is also referred to as a radiation-sensing means. Each of these components is conventional in construction, and commercially available.

Indicated generally at 16 is what might be thought of as a viewing zone in which the apparatus is intended to monitor the positions of the near sides of logs. A log within this zone is shown at 18.

Laser 10 is positioned and oriented to project a small-diameter beam (typically about 1.5-millimeters in diameter) along a projection axis shown at 20. Axis 20 extends into zone 16, and occupies the plane of the drawing.

Lens 12 is positioned and oriented to view zone 16 generally along a central viewing axis shown at 22. Axis 22 intersects axis 20, and also lies in the plane of the drawing. Lens 12 herein is a circular, double-convex lens which lies in a plane 24 that is normal both to the plane of the drawing, and to axis 22.

As was mentioned briefly earlier, the apparatus of the invention is designed to offer a preselected dynamic viewing range suited to the particular setting in which it is employed. In the specific example now being described, the apparatus of the invention is used to locate the near surfaces of logs whose diameters lie within the range of about 8-inches to about 48-inches. Logs presented in viewing zone 16 will, through conventional log-handling apparatus which is in no way involved with the present invention, normally be placed in zone 16 with their approximate central axes always closely aligned with a predetermined axis that extends (at a known location) through the viewing zone (substantially normal to the plane of the drawing.) Thus, with logs such a range of expected diameters, the required dynamic range for the illustrated system is about 20-inches.

Referring to the left side of the drawing, circular line 26 represents one "end" of the selected dynamic range, and line 28 represents the other "end". More specifically, a log having a diameter of about 48-inches would, as viewed in the drawing, have its outside generally coincident with line 26. On the other hand, an 8-inch diameter log similarly viewed would have its outside generally coincident with line 28. Line 30 represents a log having a diameter of about 24-inches. Log 18 has a diameter of about 38-inches.

Still with reference to the left side of the drawing, it can be seen that axis 20 intersects line 26 at a point 32, intersects the near surface of log 18 at a point 34, intersects line 30 at a point 36, and intersects line 28 at a point 38. These points are, of course, merely representative of the infinite number of points, between points 32, 38, where the beam from laser 10 could intersect, or impinge, the side of a log in zone 16.

With respect to the four particular points just mentioned, and considering the operation of lens 12, the lens, on its right side, images a beam-impingement occurring at point 32 along a line 40, images an impingement at point 34 with log 18 along a line 42, images an impingement at point 36 along a line 44, and images an impingement at point 38 along a line 46. Lines 40, 42, 44, 46 all lie in the plane of the drawing.

The exact angle which is used between axes 20, 22 is a matter of choice, and depends upon the specific application in which the apparatus is to be used. Generally speaking, and considering the use of a photodetector array having a particular length, the greater this angle, the smaller the dynamic range and the greater the optical resolution. Conversely, the smaller the angle, the greater the dynamic range and the poorer the optical resolution. In the particular application now being described, wherein the dynamic range is about 20-inches, the angle between these axes is about 14.5°.

Another factor which is a matter of choice, and which depends upon the particular application for the apparatus, is the distance of the apparatus from the viewing zone. In the particular apparatus illustrated herein, lens 12 is located about 60-inches from previously mentioned point 38.

Turning attention now to a key aspect of the invention, in order to maximize the resolution accuracy of the apparatus, it is important that, throughout the selected dynamic range, reflection images produced by lens 12 on array 14 all be in sharp focus where they impinge the array. For example, an image reflection from point 32 which strikes the surface of the array where the same is intersected by a line 40 should be as sharply in focus as an imaged reflection derived from any other point of intersection between the beam of the laser and the surface of a log in zone 16. With specific reference to the several illustrated points, the imaged reflection from impingement point 34 with log 18 strikes the photodetector where the same is intersected by line 42; one derived from point 36 strikes the photodetector where it is intersected by line 44; and one derived from point 38 strikes the photodetector where it is intersected by line 46.

To achieve the kind of consistant, dynamic-range, sharp focusing now being discussed, it is critical that the surface of array 14 which faces lens 12 lie along a line which intersects axis 20 at the same point where axis 20 is intersected by the plane containing lens 12. Such a line for the array is represented by line 48, and can be seen to intersect axis 20 and plane 24 at a point 50. The photodetector array may occupy different angular orientations which may be a matter of choice, but will only perform with the accuracy proposed by the present invention if the "point 50" intersection geometry just described is observed. Further, while line 48 may be disposed at a slight angle extending either toward or away from the plane of the drawing, according to a preferred embodiment of the apparatus, line 48 also lies in the plane of the drawing.

So long as the above geometrical arrangement is observed, for any selected dynamic range for the apparatus, all reflected images directed into the photodetector array throughout the range will be in sharp consistant focus thereon. Thus, information derived from the apparatus will exhibit uniform and consistant accuracy.

Completing a description of what is shown in the drawing, indicated generally in block form at 52 is a conventional scan control and signal processing unit. This unit repetitively scans the light-receiving condition of array 14, and produces, on an output conductor 54, a signal directly reflective of the position along the array at which an image appears. The present invention is not concerned with the details of unit 52. Commercially available units, like unit 52, are readily available to perform the functions just described.

It is thus now believed to be obvious how apparatus in accordance with the present invention may be constructed, arranged and used to produce extremely accurate distance measurements. Obviously, if it is desirable to look, for example, at multiple different points along the length of a long object such as a log, a plurality of apparatus units, such as the one shown in the drawing, may be used which are distributed in such a fashion to take views at predetermined intervals along the object. Further, it will be obvious that the invention is useable in an extremely wide variety of applications involving industries other than the wood products industry.

While a preferred embodiment of the invention has been described herein, it is appreciated that variations and modifications, some of which have been suggested above, may be made without departing from the spirit of the invention.

It is claimed and desired to secure by Letters Patent:

1. Electro-optical distance-measuring apparatus having a defined dynamic viewing range comprising
   means for projecting a beam of optical radiation along a defined projection axis,
   means aimed along a defined viewing axis for gathering and transmitting radiation from said beam reflected by an object impinged thereby, said gathering means generally occupying a plane which is normal to said viewing axis and which intersects said projection axis at a known point, and
   elongated, linearly distributed optical-radiation sensing means having a length relating to said viewing range, positioned to be impinged by reflected radiation transmitted by said gathering means, said sensing means including plural side-by-side adjacent sensors arranged along a substantially straight line which passes through said known point.

2. Electro-optical distance-measuring apparatus having a defined dynamic viewing range comprising
   means for projecting a beam of optical radiation along a defined projection axis,
   means aimed along a defined viewing axis for gathering and transmitting radiation from said beam reflected by an object impinged thereby, said gathering means generally occupying a plane which is normal to said viewing axis and which intersects said projection axis at a known point, and
   elongated, linearly distributed optical-radiation sensing means having a length relating to said viewing range, positioned to be impinged by reflected radiation transmitted by said gathering means, said sensing means including plural side-by-side adjacent sensors arranged along a substantially straight line which both intersects said viewing axis and passes through said known point.

3. Electro-optical distance-measuring apparatus having a defined dynamic viewing range comprising means for projecting a beam of optical radiation along a defined projection axis, means aimed along a defined viewing axis for gathering and transmitting radiation from said beam reflected by an object impinged thereby, said gathering means generally occupying a first plane which is normal to said viewing axis, which plane intersects said projection axis at a known point, said projection and viewing axes occupying a second plane and being disposed at an oblique angle relative to one another, and elongated, linearly distributed optical-radiation sensing means having a length relating to said viewing range, positioned to be impinged by reflected radiation transmitted by said gathering means, said sensing means including plural side-by-side adjacent sensors arranged along a substantially straight line which both intersects said viewing axis and passes through said known point.

4. Electro-optical distance-measuring apparatus having a defined dynamic viewing range comprising means for projecting a beam of optical radiation along a defined projection axis, means aimed along a defined viewing axis for gathering and transmitting radiation from said beam reflected by an object impinged thereby, said gathering means generally occupying a first plane which is normal to said viewing axis and which intersects said projection axis at a known point, said projection and viewing axes occupying a second plane which is normal to said first plane, with said axes disposed at an oblique angle relative to one another, and elongated, linearly distributed optical-radiation sensing means having a length relating to said viewing range, positioned to be impinged by reflected radiation transmitted by said gathering means, said sensing means including plural side-by-side adjacent sensors arranged along a substantially straight line which both intersects said viewing axis and passes through said known point.

* * * * *